(12) United States Patent
Wang et al.

(10) Patent No.: US 6,721,474 B2
(45) Date of Patent: Apr. 13, 2004

(54) FIBER OPTIC SWITCH USING GALVANOMETER-DRIVEN X-Y SCANNING

(75) Inventors: Jianhua Wang, Milpitas, CA (US); Zuyun Fang, Fremont, CA (US); Jian J. Chen, Fremont, CA (US)

(73) Assignee: Optiwork, Inc., Fremont, CA (US)

( * ) Notice: Subject to any disclaimer, the term of this patent is extended or adjusted under 35 U.S.C. 154(b) by 162 days.

(21) Appl. No.: 09/812,617

(22) Filed: Mar. 19, 2001

(65) Prior Publication Data

US 2002/0159682 A1 Oct. 31, 2002

(51) Int. Cl.[7] .............................. G02B 6/35; G02B 26/10
(52) U.S. Cl. .............................. 385/18; 385/22; 359/202
(58) Field of Search .............................. 385/22, 15, 16, 385/18, 31, 33, 25, 34, 19; 359/201, 202, 212, 223

(56) References Cited

U.S. PATENT DOCUMENTS 4,838,631 A * 6/1989 Chande et al. .............. 359/201

* cited by examiner

Primary Examiner—David V. Bruce
Assistant Examiner—Krystyna Suchecki
(74) Attorney, Agent, or Firm—Andrei D. Popovici

(57) ABSTRACT

A 1×N optical switch includes an input fiber collimator, an x-y scanning device including two perpendicular galvanometer-driven rotatable mirrors, and a 2-D array of output fiber collimators arranged over an output surface so as to be aligned with a corresponding ray extending from the x-y scanning device. Each of the output fiber collimators corresponds to a unique pair of rotation angles of the two mirrors. The output surface can have a spherical curvature, or a curvature which accounts for the dependency of optical path on the angles of the two mirrors. The switch allows improved switching speeds, accuracy, and reduced and uniform insertion losses. The architecture can be used for N×M switches and N×M cross-connects.

22 Claims, 3 Drawing Sheets

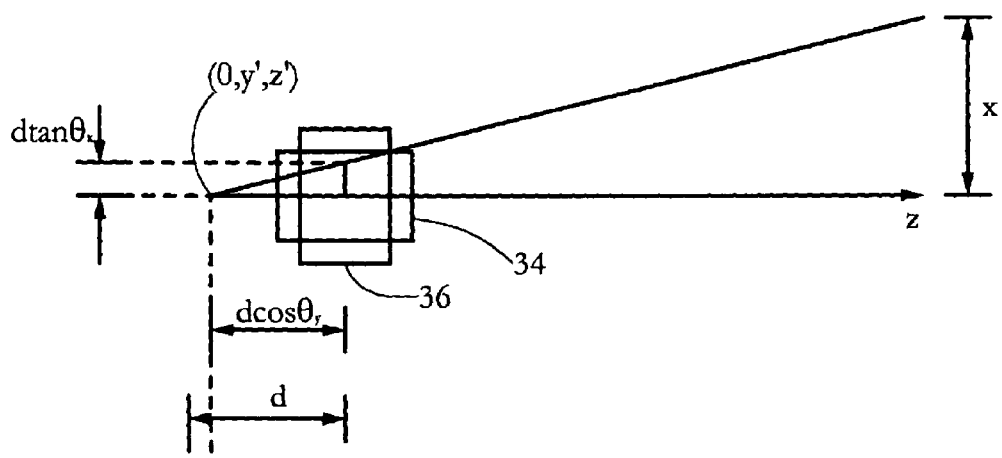
FIG. 4-A
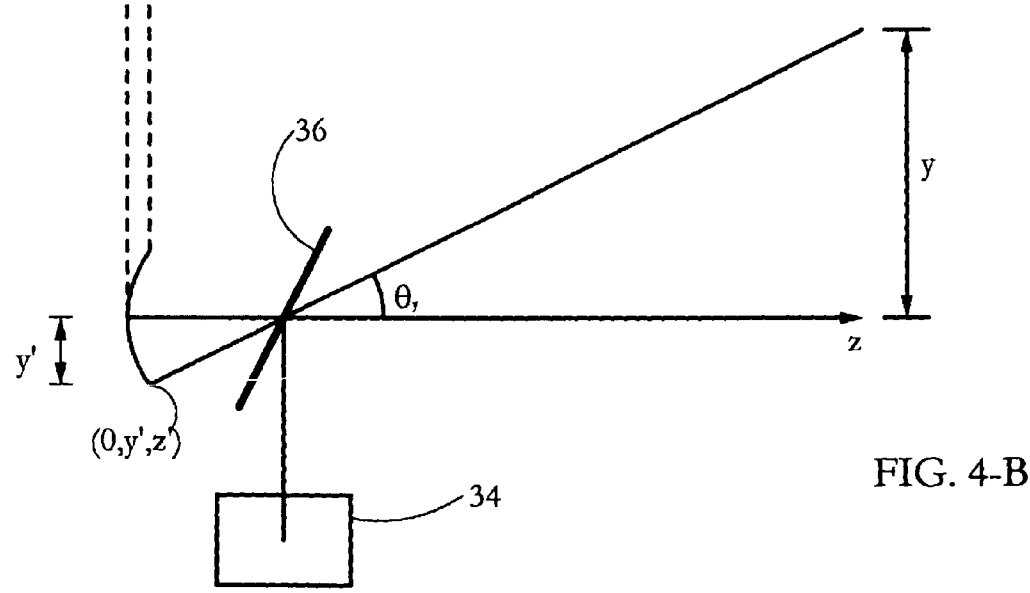
FIG. 4-B

FIBER OPTIC SWITCH USING GALVANOMETER-DRIVEN X-Y SCANNING

BACKGROUND

This invention relates to optical switches, and in particular to a fiber optic switch using X-Y scanning.

Optical switches are useful for a variety of applications, including fiber optic communications. In one design approach, optomechanical components are used to direct light from a desired optical input to a desired optical output. Conventional optomechanical switches include switches employing moving prisms, and switches employing moving fibers. While optomechanical switches can be relatively easy to manufacture, conventional optomechanical switches can suffer from limited switching speeds, reliability problems, undesirably high insertion losses, and interchannel crosstalk.

SUMMARY

The present invention provides an optical switch including an optical input for receiving a light beam; a rotatable-mirror x-y scanner optically coupled to the optical input, for selectively directing the light beam to one of a plurality of output paths; and a two-dimensional array of optical outputs capable of optical communication with the x-y scanner and aligned over an output surface, each of the optical outputs being aligned with one of the output paths so as to receive the light beam when directed by the x-y scanner onto the corresponding output path.

In the preferred embodiment, each optical input and output of the switch comprises an optical fiber collimator. The x-y scanner comprises a first mirror optically connected to the input collimator, for receiving the light beam from the input collimator; a first galvanometer coupled to the first mirror, for rotating the first mirror around a first axis so as to position the first mirror alternatively to any one of a plurality of first mirror positions; a second mirror optically connected to the first mirror, for receiving the light beam from the first mirror; and a second galvanometer coupled to the second mirror, for rotating the second mirror about a second axis perpendicular to the first axis, so as to position the second mirror alternatively to any one of a plurality of second mirror positions. Each of the output collimators is optically coupled to the second mirror, and is aligned with a ray corresponding to one of the first mirror positions and one of the second mirror positions. A light beam received at the switch input is directed to any one of the output collimators by rotating the first mirror and the second mirror to predetermined mirror positions corresponding to the selected output collimator.

The switch allows using relatively light moving parts, such as mirrors, which allow improved switching speeds. The galvanometer motors are capable of fast and precise positioning of the mirrors. Appropriate alignment and positioning of the optical input(s) and output(s) allow relatively low and uniform insertion losses.

DESCRIPTION OF THE FIGURES

FIGS. 4-A and 4-B show schematic top (x-z) and side (y-z) diagrams, respectively, of the mirrors of the switch of FIG. 2.

DETAILED DESCRIPTION

In the following description, the term "light beam" is understood to encompass light beams undergoing transformations over parts of their paths. The recitation of an element (e.g. an input) is understood to encompass at least one element.

The following description illustrates embodiments of the invention by way of example and not necessarily by way of limitation.

Figure 1:
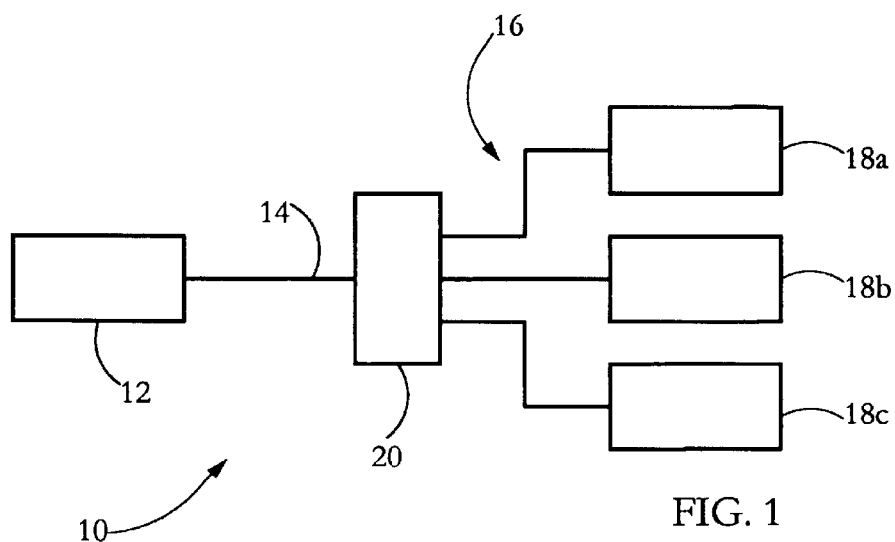
FIG. 1 is a schematic diagram of an optical system including an optical switch of the present invention.

FIG. 1 shows a schematic diagram of an optical system 10 including an optical switch 20 of the present invention. Optical system 10 can be for example an optical communications system. Optical system 10 includes an optical source 12 and a plurality of optical receivers 18a–c in optical communication with optical switch 20 over corresponding input and output optical links such as optical fibers 14, 16, respectively. Source 12 directs a light beam through input fiber 14 to optical switch 20, and a selected one of receivers 18a–c receives the light beam after passage through optical switch 20 and output fiber 16. Optical switch 20 is controlled to selectively direct the light beam to any one of receivers 18a–c.

Figure 2:
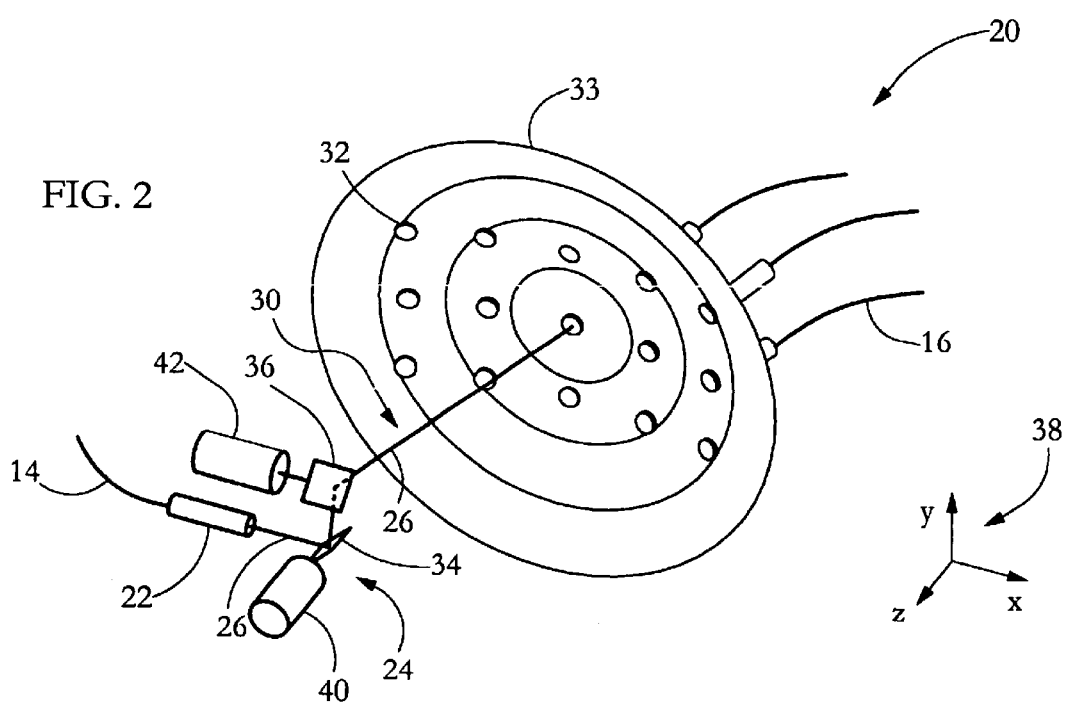
FIG. 2 shows a schematic isometric view of an optical switch according to the preferred embodiment of the present invention.

FIG. 2 shows a schematic isometric view of optical switch 20. Switch 20 includes an optical input such as an input fiber collimator 22, for receiving an external light beam through an optical fiber 14 connected to collimator 22. A galvanometer-driven, rotatable-mirror x-y optical scanner 24 is optically connected to input collimator 22, for receiving the light beam 26 from collimator 22 and selectively directing light beam 26 onto one of a plurality of potential output directions or optical paths 30. A two-dimensional array of optical outputs such as output fiber collimators 32 is arranged along an output surface facing x-y scanner 24. Each collimator 32 is aligned with a corresponding optical path 30, in order to selectively receive light extending over the corresponding optical path 30. Each output collimator 32 is connected to a corresponding output fiber 16. Packing output collimators 32 along two dimensions allows increasing the number of switch outputs for a given size of switch 20.

The output surface is defined by the positions of output collimators 32. In the preferred embodiment, the output surface coincides with the concave external surface of a support plate 33 having perpendicular apertures for holding collimators 32. Each aperture extending through support plate 33 is locally perpendicular to the surface of plate 33. Each aperture thus determines the orientation of its corresponding output collimator 32. Each output collimator 32 is aligned with a corresponding direction or optical path 30 defined by light beam 26 as directed by scanner 24. Scanner 24 selectively directs light beam 26 along any one of optical paths 30 to a corresponding selected output collimator 32. The optical pathlength of light beam 26 through switch 20 is preferably substantially the same for any selected output collimator 32. The alignment of each output collimator 32 along its corresponding optical path 30 at an equal optical pathlength away from input collimator 22 allows for reduced and uniform insertion losses, and reduced interchannel crosstalk.

Scanner 24 comprises a first rotatable planar mirror (reflective surface) 34 optically connected to input collimator 22, and a second rotatable planar mirror 36 optically connected to first mirror 34. First mirror 34 and second mirror 36 are capable of independent rotation about mutually perpendicular axes. In the axis nomenclature 38 illustrated in FIG. 2, first mirror 34 is capable of rotation about an axis parallel to the z-axis, while second mirror 36 is capable of independent rotation about the x-axis. Light beam 26 extends from input collimator 22 along the x-direction, and is reflected by first mirror 34 generally along the y-direction toward second mirror 36. Second mirror 36 then reflects light beam 26 generally in the z-direction, toward a selected output collimator 32. Each collimator 32 corresponds to a given first mirror position of first mirror 34 and a given second mirror position of second mirror 36. Different collimators 32 can be sequentially selected by appropriately rotating first mirror 34 and second mirror 36 to the mirror positions corresponding to the collimator 32 to be selected.

First mirror 34 is coupled to a first galvanometer motor 40, while second mirror 36 is coupled to a second galvanometer motor 42. Galvanometers 40, 42 are capable of independently and continuously driving the rotational motions of mirrors 34, 36. Galvanometers 40, 42 can be conventional galvanometers, for example as manufactured by Cambridge Technology, Cambridge, Mass. Each galvanometer 40, 42 includes a magnetic-based driving mechanism for rotating its corresponding mirror, and a position detector for detecting the rotational position of the galvanometer 40, 42. A controller including a memory or storage device is coupled to galvanometers 40, 42, for controlling the rotation of mirrors 34, 36 to predetermined calibrated positions corresponding to collimators 32. The controller can be a general purpose computer or a dedicated control device.

Employing galvanometers for driving the motion of mirrors 34, 36 allows improved accuracy and switching speeds for switch 20. Mirrors 34, 36 can have relatively low mass, which allows improved switching speeds, on the order of 1 ms with commercially available galvanometers. Moreover, the capability of galvanometers 40, 42 to drive the motion of mirrors 34, 36 continuously and accurately allows for improved insertion losses. For example, commercially available galvanometers can achieve angular resolutions of 15 microradians, which were observed to allow uniform insertion losses of less than 0.5 dB for each channel defined by an output collimator 32.

The shape of the output surface defined by output collimators 32 is preferably defined by the condition that the optical path from input collimator 22 to any one of collimators 32 is constant. In a first approximation, the surface defined by the constant-optical-path condition is spherical, with a radius of curvature valued between R and R+d, wherein R is the distance between the second mirror 36 output collimators 32, and d is the distance between the axes of mirrors 34, 36.

Figure 3:
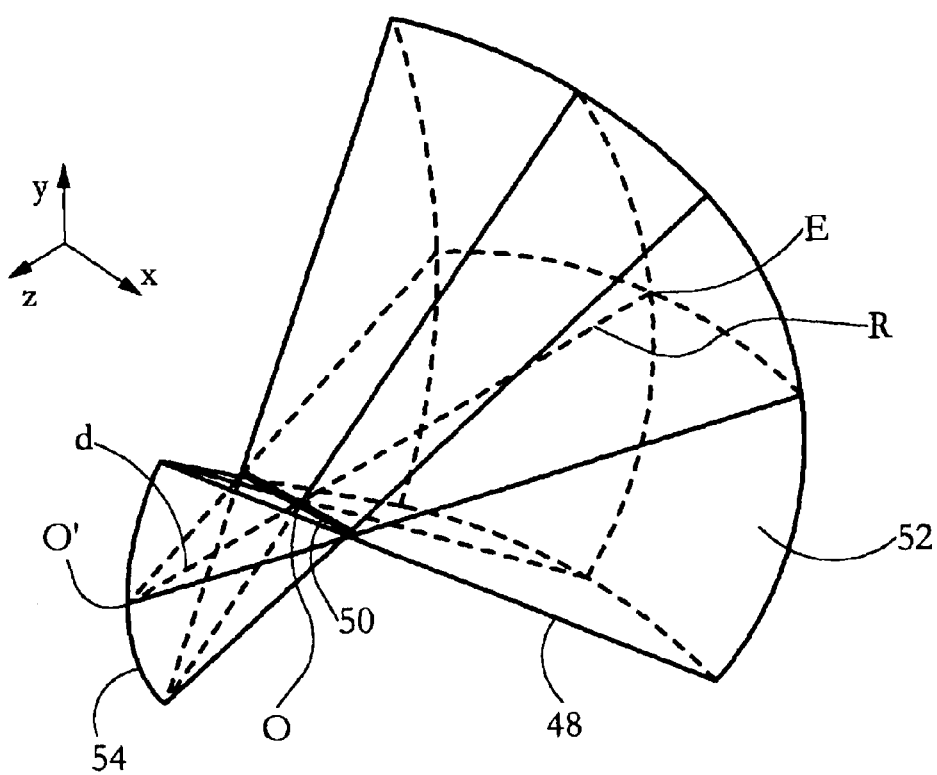
FIG. 3 shows an isometric view of a ray diagram illustrating the propagation of light through the switch of FIG. 2.

More precisely, the shape of the constant-optical-path output surface can be defined so as to account for the effects of the rotational positions of mirrors 34, 36 on the corresponding optical paths 30. A precise definition of the surface corresponding to an exact constant-optical-path condition can be better understood with reference to FIG. 3. Consider several rays 48 extending from a line 50 corresponding to the reflective surface of second mirror 36 (shown in FIG. 2). Line 50 denotes the set of points along second mirror 36 that are hit by light as first mirror 34 is rotated. Rays 48 define a concave, constant-optical-path output surface 52. The origin is denoted as O, while the intersection of the z-axis and output surface 52 defines a zenith point E. Line 50 coincides with the x-axis, and passes through origin O. The point O' denotes the midpoint of a virtual image curve 54. Virtual image curve 54 lies along the y-z (x=0) plane. Virtual image 54 is shaped as an arc of a circle centered at the origin O, and having a radius d. The radius d is equal to the distance between the axes of mirrors 34, 36. The distance between origin O and zenith E is marked as R.

To derive the exact condition characterizing output surface 52, consider an arbitrary point of coordinates (x,y,z) along output surface 52, and a corresponding virtual image point of coordinates (0,y',z'). The point coordinates satisfy the conditions $$y'^2 + z'^2 = d^2 \qquad [1a]$$

and $$\frac{y}{y'} = \frac{z}{z'}. \qquad [1a]$$

These conditions can be re-written as $$y' = -\frac{y}{\sqrt{y^2 + z^2}} d \qquad [2a]$$

and $$z' = -\frac{z}{\sqrt{y^2 + z^2}} d. \qquad [2a]$$

If we now set the optical path s=R+d to be equal to $$s = \sqrt{(x-x')^2 + (y-y')^2 + (z-z')^2}, \qquad [3]$$

we can derive the equation characterizing constant-optical-path output surface 52 as $$z = \sqrt{\left(\sqrt{(R+d)^2 - x^2} - d\right)^2 - y^2}. \qquad [4]$$

Eq. [4] can be re-written parametrically as a function of the rotational angles of mirrors 34, 36. FIGS. 4-A and 4-B show schematic x-z and y-z plane views, respectively, of mirrors 34, 36. The angle $\theta_x$ denotes the angle between the two rays corresponding to the points (x, y, z) and (0, y, z), extending from mirrors 34, 36. The angle $\theta_y$ denotes the angle between the z-axis and the projection on the y-z plane of the ray corresponding to the point (x, y, z) extending from mirror 36. From FIG. 4-B, it can be seen that $$\frac{y}{z} = \tan\theta_y, \qquad [5a]$$

and $$\frac{x}{z + d\cos\theta_y} = \frac{d\tan\theta_x}{d\cos\theta_y} \qquad [5b]$$

Eqs. [5a] and [5b] can be used to re-write eq. [4] parametrically as $$x = (R+d)\sin\theta_x \qquad [6]$$
$$y = [(R+d)\cos\theta_x - d]\sin\theta_y$$
$$z = [(R+d)\cos\theta_x - d]\cos\theta_y$$

As is apparent to the skilled artisan, the exact constant-optical-path equations above are derived for free-space light propagation between input collimator 22 and output collimators 32. If processing optics such as lenses are introduced in the optical path between input collimator 22 and output collimators 32, the shape of the exact constant-optical-pathlength surface will change accordingly.

The preferred process of making switch 20 will now be described with reference to FIG. 2. First, plate 33 and its perpendicular apertures are machined so as to correspond to a desired output surface. Plate 33, input collimator 22, and x-y scanner 24 are then mounted on a rigid frame made of a low-thermal-expansion-coefficient material such as Invar or stainless steel. The orientation and position of each output collimator 32 is adjusted for the corresponding x-y scanner mirror orientations, so as to minimize the insertion loss through each output collimator 32. The angular positions of the x-y scanner mirrors corresponding to each output collimator 32 are then recorded in memory or storage, for recall during the subsequent operation of switch 20.

As is apparent from the above discussion, the described devices and methods can be readily used to perform M×1 switching, by reversing the direction of light propagation and appropriately controlling the x-y scanner of the switch. An M×1 switch then has an array of optical inputs and a single optical output. The x-y scanner of the switch is used to select one of multiple input light beams for transmission to the output.

A 1×N switch as described above can be used in combination with a similar M×1 switch in order to make an M×N switch. The single fiber ports of the two switches are connected to each other along a fixed intermediate path. The first x-y scanner is then used to select one of a plurality of input light beams for transmission along the intermediate path. The second x-y scanner receives the selected light beam over the intermediate path, and transmits the light beam to a selected output. Each of the arrays of optical inputs and outputs is arranged over a surface characterized by a constant optical path relative to its respective x-y scanner.

Moreover, an array of M 1×N switches can be connected to an array of N M×1 switches as described above to make an M×N cross-connect device. The outputs of the 1×N switches are connected to the inputs of the M×1 switches. Each output of an array of N outputs of a given 1×N switch is connected to a corresponding input from a different M×1 switch.

It will be clear to one skilled in the art that the above embodiments may be altered in many ways without departing from the scope of the invention. For example, various additional optical components such as lenses or mirrors can be used in a switch of the present invention. An additional focusing lens or lenses can be introduced between the input collimator and the x-y scanner, between the x-y scanner and the switch output array, or instead of the input collimator. Such additional optical components can alter the exact geometry of the output collimator surface corresponding to a constant optical path.

For example, if a cylindrical lens is placed between the second mirror and the output surface, with the cylindrical axis of the lens coinciding with the axis of rotation of the second mirror, the output surface will have a cylindrical curvature centered around the y-axis. Moreover, as is apparent to the skilled artisan, while the above description focuses primarily on an 1×N switch, the methods and devices described above can be readily used for N×1 switches by reversing the direction of light propagation through the device, and using the described inputs as outputs and the described outputs as inputs. Accordingly, the scope of the invention should be determined by the following claims and their legal equivalents.

What is claimed is:

1. An optical switch comprising:
a) an input fiber collimator for receiving a light beam;
b) a first mirror optically connected to the input collimator, for receiving the light beam from the input collimator;
c) a first galvanometer coupled to the first mirror, for rotating the first mirror around a first axis so as to position the first mirror alternatively to any one of a plurality of first mirror positions;
d) a second mirror optically connected to the first mirror, for receiving the light beam from the first mirror;
e) a second galvanometer coupled to the second mirror, for rotating the second mirror about a second axis perpendicular to the first axis, so as to position the second mirror alternatively to any one of a plurality of second mirror positions; and
f) a two-dimensional array of output fiber collimators each optically coupled to the second mirror, each of the output collimators being aligned with a ray corresponding to one of the first mirror positions and one of the second mirror positions, whereby the light beam is directed to any one of the output collimators by rotating the first mirror and the second mirror.

2. The switch of claim 1 wherein the array of output collimators is arranged over an output surface having a substantially spherical curvature of a radius valued between R and R+d, wherein R is a distance between the second mirror and the output surface, and d is a distance between the first axis and the second axis.

3. The switch of claim 1 wherein the array of output collimators is arranged over an output surface defined substantially by an exact constant optical path condition accounting for a dependence of the optical path between the input collimator and each of the output collimators on an orientation of the first mirror and an orientation of the second mirror.

4. The switch of claim 3 wherein the exact constant optical path condition is $$z = \sqrt{\left[\left(\sqrt{(R+d)^2 - x^2} - d\right)^2 - y^2\right]}$$

wherein R is distance between the second mirror and the output surface, and d is a distance between the first axis and the second axis.

5. The optical switch of claim 1, wherein the two-dimensional array of output fiber collimators is situated along a curved output surface.

6. An optical switch comprising:
a) an input fiber collimator for receiving a light beam;
b) a galvanometer-driven, rotatable-mirror x-y scanner optically coupled to the input fiber collimator, for directing the light beam to one of a plurality of directions; and
c) an array of output fiber collimators arranged over a concave output surface, each of the output collimators being aligned with one of the directions so as to receive the light beam when directed by the x-y scanner.

7. The optical switch of claim 6 wherein the output surface has a substantially spherical curvature.

8. The optical switch of claim 6 wherein the output surface is defined substantially by a constant optical path condition accounting for a dependence of an optical path corresponding to each direction on an orientation of the x-y scanner.

9. An optical system comprising:
a) an optical source for generating a light beam;
b) an optical switch in optical communication with the optical source, for receiving and directing the light beam, the optical switch comprising:
an input fiber collimator optically connected to the optical source, for receiving the light beam,
a galvanometer-driven, rotatable-mirror x-y scanner optically coupled to the input fiber collimator, for selectively directing the light beam to one of a plurality of output paths, and
an array of output fiber collimators capable of optical communication with the x-y scanner, each of the output fiber collimators being aligned to one of the output paths so as to receive the light beam when directed by the x-y scanner, and c) an array of optical receivers each optically connected to a corresponding output fiber collimator, for receiving the light beam when directed by the x-y scanner to the corresponding output fiber collimator.

10. An optical switch comprising:
a) a first rotatable-mirror x-y scanner for selectively directing a selected one of a plurality of received light beams to a fixed intermediate path; and
b) an array of optical inputs capable of optical communication with the first x-y scanner and aligned over a concave input surface, for receiving the plurality of light beams and directing the plurality of light beams to the first x-y scanner;
c) a second rotatable-mirror x-y scanner optically connected to the first x-y scanner over the fixed intermediate path, for receiving the selected one of the plurality of light beams and selectively directing the selected one of the plurality of light beams to one of a plurality of output paths; and
d) an array of optical outputs capable of optical communication with the second x-y scanner and aligned over a concave output surface, each of the optical outputs corresponding to one of the output paths so as to receive the selected one of the plurality of light beams when directed by the second x-y scanner.

11. The switch of claim 10, wherein each of the optical inputs comprises an input fiber collimator.

12. The switch of claim 11, wherein each of the optical outputs comprises an output fiber collimator.

13. An optical switch comprising:
a) an optical output for directing a light beam to an optical receiver;
b) a galvanomoter-driven, rotatable-mirror x-y scanner optically coupled to the optical output, for selectively directing one of a plurality of received light beams to the optical output; and
c) an array of optical inputs capable of optical communication with the x-y scanner and aligned over a concave input surface, each of the optical inputs directing one of the plurality of light beams to the x-y scanner.

14. The switch of claim 13, wherein each of the optical inputs comprises an input fiber collimator.

15. The switch of claim 14, wherein the optical output comprises an output fiber collimator.

16. A method of switching a light beam between at least one input fiber and at least one of an array of output fibers, comprising the steps of:
a) collimating the light beam and directing the light beam to a first mirror;
b) controlling a first galvanometer to rotate the first mirror around a first axis so as to position the first mirror alternatively to any one of a plurality of first mirror positions;
c) receiving the light beam at the first mirror and directing the light beam to a second mirror;
d) controlling a second galvanometer to rotate the second mirror about a second axis perpendicular to the first axis, so as to position the second mirror alternatively to any one of a plurality of second mirror positions;
e) receiving the light beam at the second mirror and directing the light beam to a selected one of an array of output fiber collimators, each of the output collimators being aligned with a ray corresponding to one of the first mirror positions and one of the second mirror positions; and
f) receiving the light beam at the selected one of the array of output fiber collimators, and collimating and directing the light beam to an output optical fiber coupled to the selected one of the array of output fiber collimators.

17. An optical switching method comprising the steps of:
a) collimating a light beam by passing the light beam through an input fiber collimator, and directing the light beam to a galvanometer-driven, rotatable-mirror x-y scanner;
b) controlling the galvanometer-driven, rotatable-mirror x-y scanner to selectively direct the light beam to one of a plurality of output paths; and
c) receiving the light beam at a selected one of an array of optical outputs aligned over a concave output surface, each of the optical outputs being aligned with one of the output paths so as to receive the light beam when directed by the x-y scanner.

18. The method of claim 17 wherein the array of optical outputs is arranged over an output surface having a substantially spherical curvature of a radius valued between R and R+d, wherein R is an optical distance between the x-y scanner and the output surface, and d is a distance between a first scan axis and a second scan axis orthogonal to the first scan axis.

19. The method of claim 17 wherein the array of optical outputs is arranged over an output surface defined substantially by an exact constant optical path condition accounting for a dependence of the optical path between the optical input and each of the optical output on an orientation of the x-y scanner.

20. The method of claim 19 wherein the exact constant optical path condition is $$z = \sqrt{\left[\left(\sqrt{(R+d)^2 - x^2} - d\right)^2 - y^2\right]}$$

wherein R is an optical distance between the x-y scanner and the output surface, and d is a distance between a first scan axis and a second scan axis orthogonal to the first scan axis.

21. The method of claim 17, wherein:
the array of optical outputs comprises an array of output fiber collimators; and
the method further comprises individually aligning each of the fiber collimators with a corresponding output path during an assembly of the array of output fiber collimators.

22. The method of claim 17, wherein the array of optical outputs is situated along a curved output surface.

* * * * *